US010344802B1

(12) United States Patent
Hurst et al.

(10) Patent No.: US 10,344,802 B1
(45) Date of Patent: Jul. 9, 2019

(54) SEAL ASSEMBLY FOR SPHERICAL PLAIN BEARING (71) Applicant: Aktiebolaget SKF, Göteborg (SE)

(72) Inventors: Daniel Hurst, West Jordan, UT (US); Tadd McBride, Riverton, UT (US)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/923,487

(22) Filed: Mar. 16, 2018

(51) Int. Cl.
*F16C 23/04* (2006.01)
*F16C 33/74* (2006.01)
*F16C 33/78* (2006.01)

(52) U.S. Cl.
CPC ............ *F16C 33/74* (2013.01); *F16C 23/043* (2013.01); *F16C 33/783* (2013.01); *F16C 33/7823* (2013.01)

(58) Field of Classification Search
CPC ...... F16C 23/04; F16C 23/043; F16C 23/045; F16C 23/046; F16C 33/74; F16C 33/7823; F16C 33/783
See application file for complete search history.

(56) References Cited

U.S. PATENT DOCUMENTS 4,385,673 A * 5/1983 Olt, Jr. .................... F16C 33/74
 180/9.5
4,553,760 A * 11/1985 Reed ..................... F16C 23/045
 180/9.5

FOREIGN PATENT DOCUMENTS

DE 102016203741 * 4/2017
WO WO2010020223 * 2/2010

* cited by examiner

*Primary Examiner* — James Pilkington
(74) *Attorney, Agent, or Firm* — Mark Ussai; SKF USA Inc. Patent Dept.

(57) ABSTRACT

A seal assembly is for a spherical plain bearing with an inner ring mounted on a shaft and an outer ring disposed about the inner ring and having a concave inner surface slidably displaceable against the inner ring convex outer surface. The seal assembly includes an annular inner member disposed about the shaft axially adjacent to the bearing inner ring and having opposing first and second axial ends and an outer engagement surface extending axially between the first and second ends. A generally annular outer member has a base portion coupled with the bearing outer ring and a lip portion extending radially inwardly from the base portion and having an outer end sealingly engageable with the outer engagement surface of the seal inner member. The lip portion slidably displaces generally axially along the inner member engagement surface when the outer ring displaces axially relative to the inner ring.

16 Claims, 13 Drawing Sheets

SEAL ASSEMBLY FOR SPHERICAL PLAIN BEARING

BACKGROUND OF THE INVENTION

The present invention relates to seals, and more particularly to seals for spherical plain bearings.

Spherical plain bearings are well known and typically include an inner ring with a convex outer surface and an outer ring with a concave inner surface disposed against the inner ring outer surface. The inner ring is generally disposed upon a shaft and the outer ring is disposed within an outer member, for example a rod, and permit both angular displacement about a central axis through the inner ring and axial "cocking" of rod with respect to the shaft, or vice-versa. Often such bearings include a seal, which is typically an annular ring attached to one of the bearing rings, usually the outer ring, and having a lip that engages with the mating surface of the other ring.

SUMMARY OF THE INVENTION

In one aspect, the present invention is a seal assembly for sealing a spherical plain bearing having an inner ring with a convex outer surface, the inner ring being mounted on a shaft with a central axis, and an outer ring disposed about the inner ring and having a concave inner surface slidably displaceable against the inner ring outer surface. The seal assembly comprises a generally annular inner member disposed about the shaft axially adjacent to the bearing inner ring and having opposing first and second axial ends and an outer engagement surface extending axially between the first and second ends. A generally annular outer member has a base portion coupled with the bearing outer ring and a lip portion extending radially inwardly from the base portion and having an outer end sealingly engageable with the outer engagement surface of the seal inner member. The lip portion slidably displaces generally axially along the inner member engagement surface when the outer ring displaces axially relative to the inner ring.

In another aspect, the present invention is a mechanical assembly comprising a shaft having a central axis and a spherical plain bearing having an inner ring with a convex outer surface, the inner ring being mounted on the shaft, and an outer ring disposed about the inner ring and having a concave inner surface slidably displaceable against the inner ring outer surface. A joint member is coupled with the shaft so as to be spaced axially from the plain bearing and has a radial surface. A seal assembly includes a generally annular inner member disposed about the shaft axially between the bearing inner ring and the joint member, the inner member having opposing first and second axial ends and an outer engagement surface extending axially between the first and second ends. The first axial end is located adjacent to the bearing inner ring and the second axial end includes a sealing portion configured to sealingly engage with the joint member radial surface. A generally annular seal outer member has a base portion coupled with the bearing outer ring and a lip portion extending radially inwardly from the base portion and having an outer end sealingly engageable with the outer engagement surface of the seal inner member. The lip portion slidably displaces generally axially along the inner member engagement surface when the outer ring displaces axially relative to the inner ring.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a seal assembly 10 for sealing a spherical plain bearing 12 having an inner ring 14 with a convex outer surface 16, the inner ring 14 being mounted on a shaft 18 with a central axis $A_C$, and an outer ring 20. The outer ring 20 is disposed about the inner ring 14 and has a concave inner circumferential surface 22 slidably displaceable against the inner ring outer surface 16. The plain bearing 12 and the shaft 18 are each components of a mechanical assembly 24, most preferably a pin joint 25. The assembly/pin joint 24 further includes at least one and preferably first and second bosses or joint members 26, 28, respectively, mounted on the shaft 18 and a rod 30 movably coupled with the shaft 18. The two joint members 26, 28 each have a generally radial surface 27, 29, respectively, and are spaced axially from opposing sides of the plain bearing 12, such that the bearing 12 is disposed generally centrally between the joint members 26, 28. The rod 30 has an end 30a with a circular bore 31, the bearing outer ring 20 being disposed within the rod bore 31 such that the rod 30 is movably coupled with the shaft 18 through the bearing 12.

The rod 30 and the bearing outer ring 20 are angularly displaceable about the axis $A_C$ relative to the shaft 18 and bearing inner ring 14, either by movement of the rod 30 about the shaft 18, or vice-versa. Additionally, the rod 30 and the outer ring 20 are also angularly displaceable about a plurality of axes $A_P$ (one indicated) generally perpendicular to the central axis $A_C$. Thereby, the rod 30 and the ring 20 are moveable generally along the axis $A_C$ between a first maximum position $P_1$ in a first direction $D_1$ along the axis $A_C$, shown in FIGS. 1, 3 and 5, and a second maximum axial position $P_2$ in a second direction $D_2$ along the axis $A_C$, as depicted in FIGS. 4 and 6.

The seal assembly 10 basically comprises a generally annular inner member 40 disposed about the shaft 18 axially adjacent to the bearing inner ring 14 and a generally annular outer member 50. The seal outer member 50 is coupled with the bearing outer ring 20 and is sealingly engageable with the inner member 40 to prevent ingress of fluids or solid contaminants into the bearing 12. Preferably, the mechanical assembly 24 includes two seal assemblies 10, a first seal assembly 11A sealing the bearing first axial side 12a and a second seal assembly 11B sealing the bearing second axial side 12b, as described in further detail below. However, in certain applications, a single seal assembly 10 may be used on only one side 12a or 12b of the plain bearing 12, depending on the particular structure of the mechanical assembly 24. Further, the one or two seal assemblies 10 are each preferably configured to seal between the shaft 18 and one of the joint members 26, 28, as described in detail below.

Figure 8:
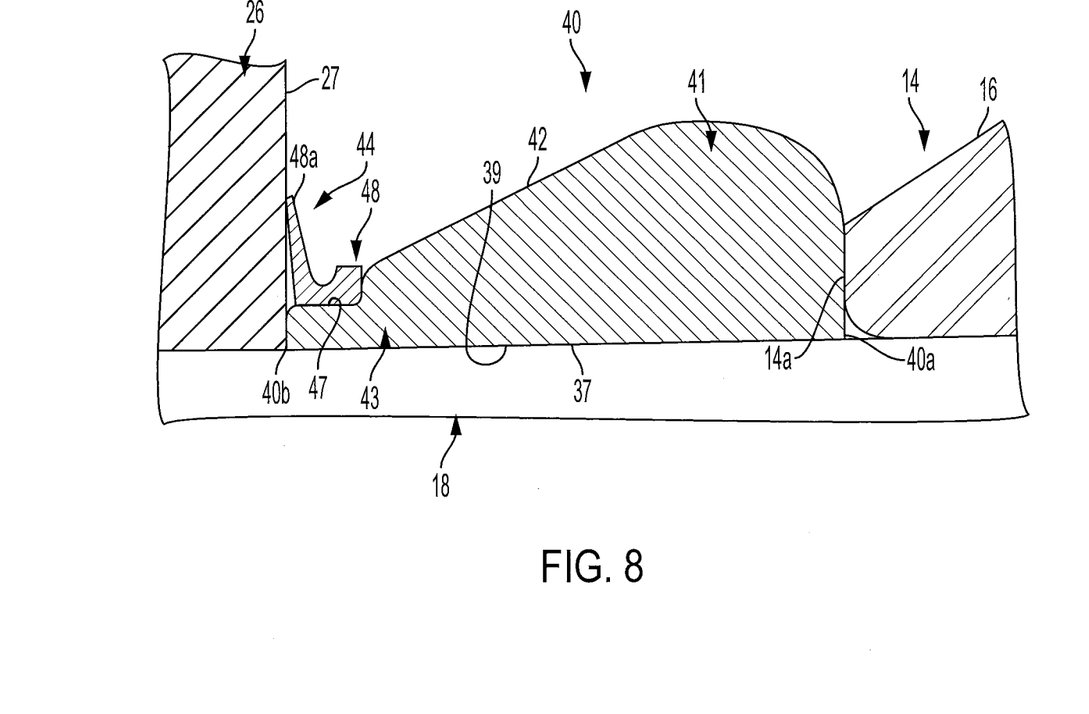
FIG. 8 is broken-away, axial cross-sectional view of the seal inner member in accordance with a second construction having a separate V-ring seal in an open groove, shown mounted about a shaft between the bearing inner ring and the joint member.
Figure 9:
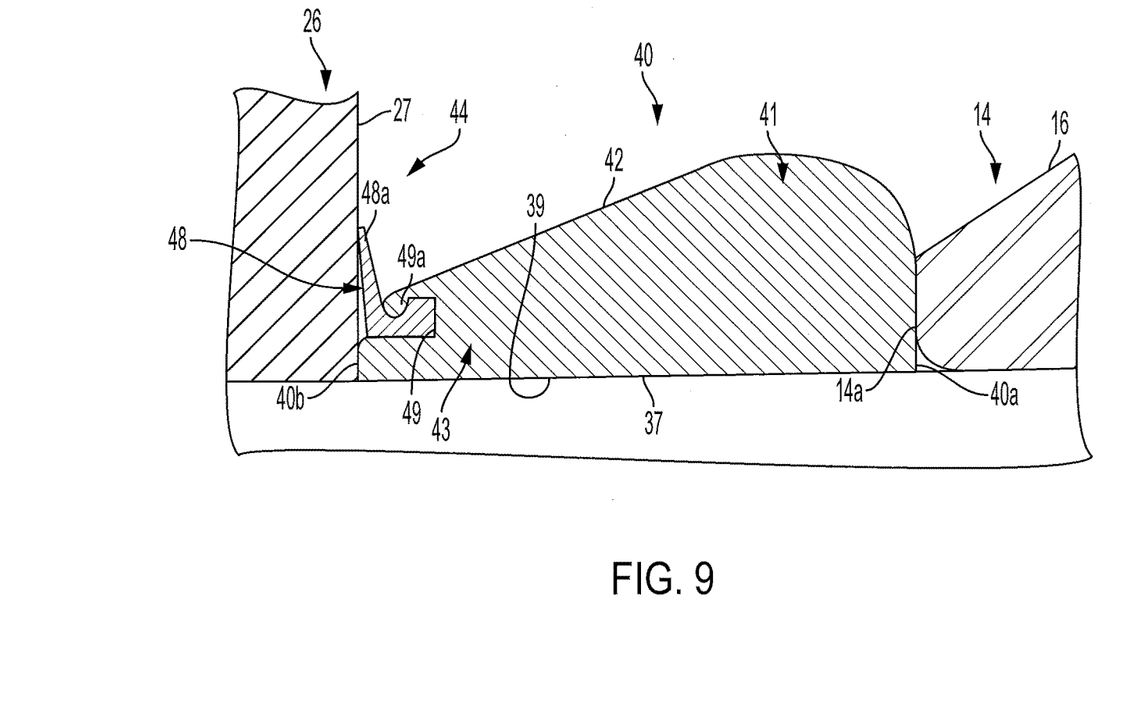
FIG. 9 is broken-away, axial cross-sectional view of the seal inner member in accordance with a third construction having a separate V-ring seal in a closed groove, shown mounted about the shaft between the bearing inner ring and the joint member.
Figure 10:
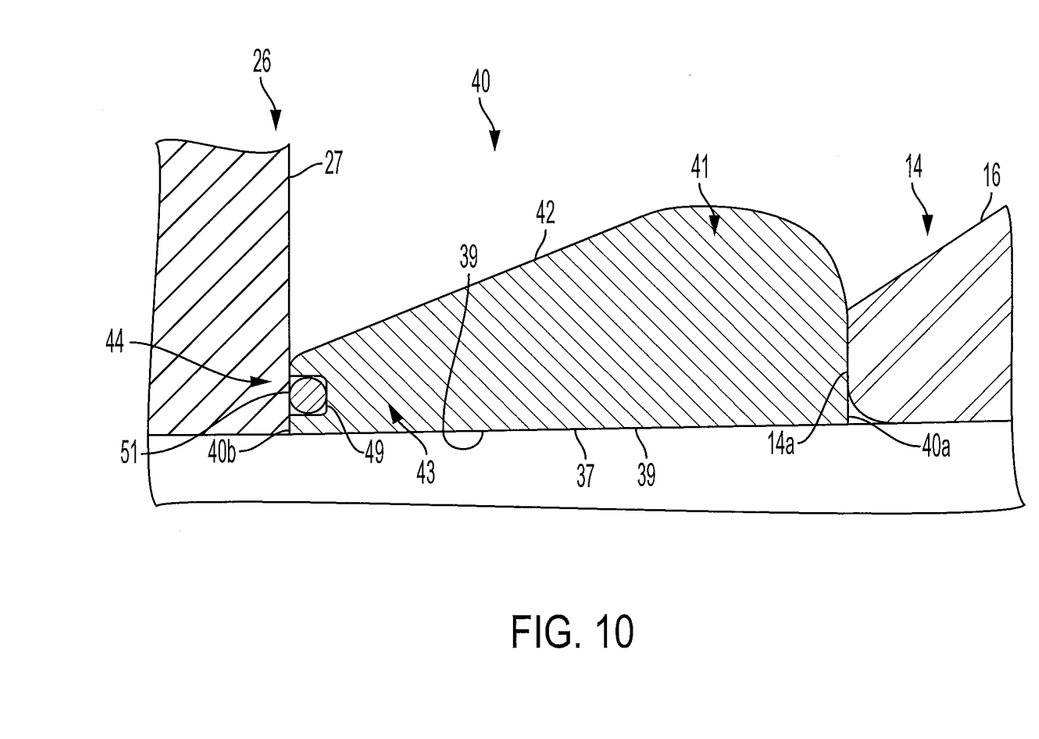
FIG. 10 is broken-away, axial cross-sectional view of the seal inner member in accordance with a third construction having a separate O-ring seal in a closed groove, shown mounted about the shaft between the bearing inner ring and the joint member.

Referring to FIGS. 5-10, each seal inner member 40 has a centerline $L_C$, opposing first and second axial ends 40a, 40b and an outer engagement surface 42 extending axially between the first and second ends 40a, 40b. The inner member 40 further has an inner surface 37 defining a bore 39 for receiving the shaft 18 or a sleeve 19, as discussed below. Preferably, the first axial end 40a of the seal inner member 40 is located adjacent to the bearing inner ring 14, most preferably abutting an axial end 14a or 14b of the ring 14, but may be axially separated by a spacer ring, etc. (none shown). The second axial end 40b of the seal inner member 40 includes a sealing portion 44 configured to sealingly engage with the radial surface 27 of the first joint member 26 or the radial surface 29 of the second joint member 28. The sealing portion 44 is either integrally formed with a remainder of the inner member 40, as shown in FIGS. 1 and 3-7, or is provided by a separate seal ring 46 coupled with the remainder of the inner member 40, as depicted in FIGS. 8-10. In either case, the sealing portion 44 of each seal inner member 40 seals the interface between the boss/joint member 26 or 28 and the shaft 18.

Further, the seal inner member 40 is preferably formed as a one-piece construction of a polymeric material or two or more pieces of a combination of two different polymeric materials or a polymeric material and a metallic material. More specifically, in a first construction shown in FIGS. 1 and 3-7, the inner member 40 is a one-piece construction of a polymeric material, preferably Polyurethane, but may be any elastomer, a rigid polymer, etc., and includes an integral sealing portion 44. The sealing portion 44 is preferably formed as an integral cantilever lip 45 having a free end 45a sealingly engageable with the joint member radial surface 27 or 29. In such a construction, the mechanical assembly 24 preferably includes an annular, generally rigid spacer ring 19 with opposing ends 19a, 19b disposed against the bearing inner ring 14 and one of the joint members 26 or 28.

Figure 1:
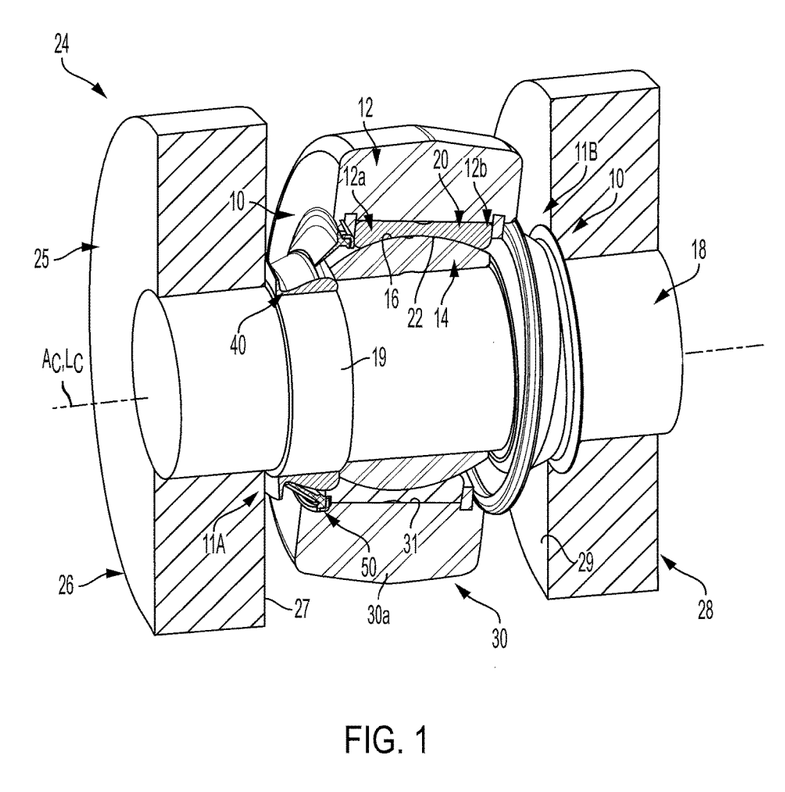
FIG. 1 is a perspective view in partial axial cross-section of a mechanical assembly including a spherical plain bearing and two seal assemblies in accordance with the present invention.
Figure 2:
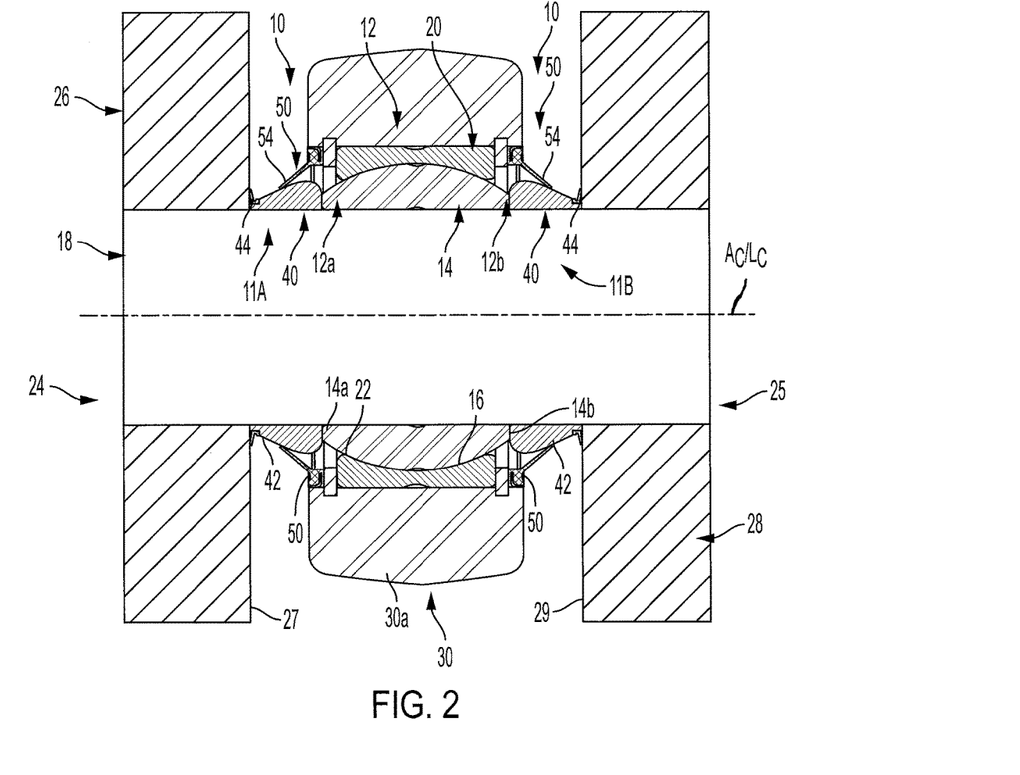
FIG. 2 is an axial cross-sectional view of the mechanical assembly, showing the plain bearing in a "neutral" position centered about a shaft.

In a second construction shown in FIGS. 2 and 8, the seal inner member 40 has an open annular groove 47 extending axially-inwardly from the second axial end 40 and the separate seal ring 46 is formed as a V-ring seal 48. The V-ring seal 48 has an extended leg 48a which seals axially against the radial surface 27 or 29 of one of the joint members 26, 28. Referring specifically to FIG. 9, a third construction of the seal inner member 40 is similar to the second construction, but includes a closed annular groove 49 with a lip 49a to retain the V-ring ring seal 48 in the groove 49. In a fourth construction shown in FIG. 10, the seal inner member includes a separate seal 46 formed as conventional O-ring 51 disposed in a closed groove 49, formed without a lip, in the remainder of the seal inner member 40. In each of the second, third and fourth constructions, the V-ring seal 48 or O-ring 51 is preferably formed of a flexible polymer, such as rubber or polyurethane, and the remainder of the seal inner member 40 is formed of a more rigid polymer (e.g., Nylon, Acetal, etc.) or a metallic material (e.g., low carbon steel, aluminum, etc.).

Referring now to FIGS. 8-11, the seal inner member(s) 40 are each preferably formed such that the outer engagement surface 42 tapers along the centerline $L_C$. Specifically, the seal inner member 40 has a radially-larger section 41 located generally proximal to the seal member first axial end 40a and a radially-smaller section 43 located axially between the radially-larger section 41 and the seal member second axial end 40b, and is preferably located adjacent to the second axial end 40b. The inner member engagement surface 42 tapers radially-inwardly along the centerline $L_C$ from the radially-larger section 41 to the radially-smaller section 43. Preferably, the engagement surface 42 tapers substantially linearly, but may alternatively taper in a generally curvilinear manner, either concavely or convexly.

Referring to FIGS. 1-6 and 11-13, each seal outer member 50 has a base portion 52 coupled with the bearing outer ring 20 and a lip portion 54 extending radially inwardly from the base portion 52. The lip portion 54 has an outer end 54a sealingly engageable with the outer engagement surface 42 of the seal inner member 40. Preferably, the base portion 52 has generally rectangular axial cross-sections and the lip portion 54 has elongated, generally cantilever-like axial cross-sections. The outer member lip portion 54 has an inner radial end 54b integrally formed with the base portion 52 and the outer radial end 54a provides a circumferential sealing surface 55. Further, the elongated lip portion 54 is bendable with respect to the base portion 52 about the inner end 54b when traversing the inner member engagement surface 42, as described in further detail below.

Figure 11:
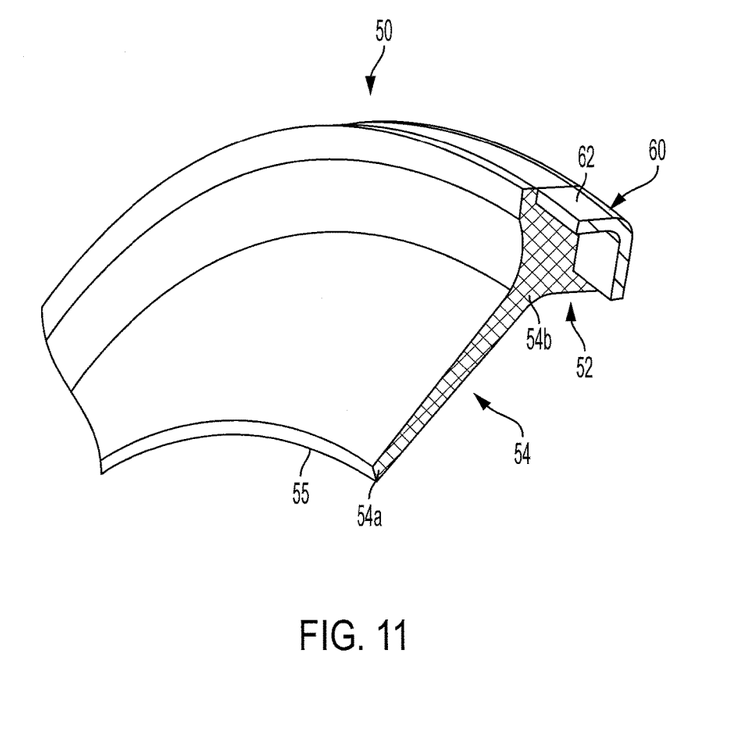
FIG. 11 is broken-away, perspective view of an outer member of the seal assembly.
Figure 12:
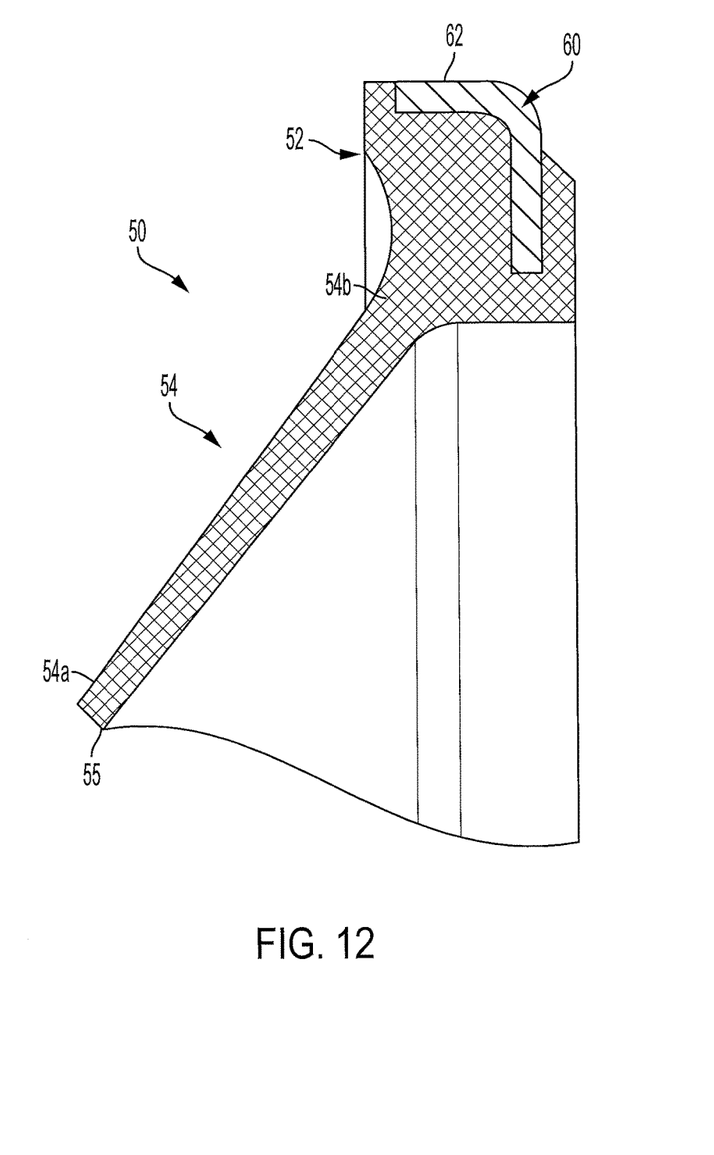
FIG. 12 is a broken-away, axial cross-sectional view of the seal outer member.
Figure 13:
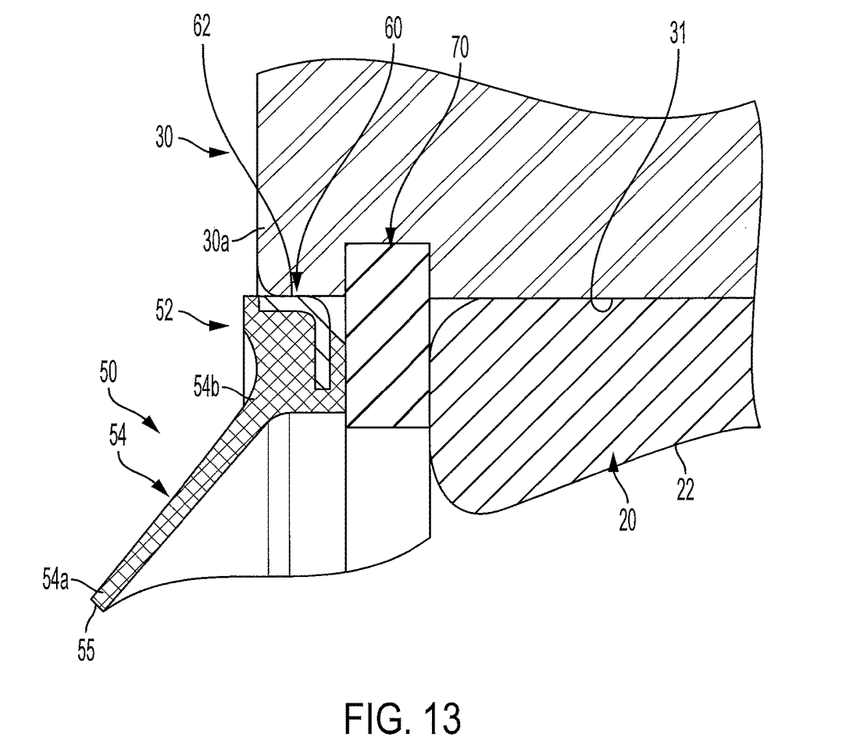
FIG. 13 is a broken-away, axial cross-sectional view of the seal outer member shown installed within a rod bore and coupled with the bearing outer ring.

Preferably, the base portion 52 of each seal outer member 50 includes a rigid, generally annular support member 60 disposed within a remainder of the base portion 52 and preferably having generally L-shaped axial cross-sections. The support member 60 has an outer surface 62 frictionally engageable with an inner circumferential surface 30a of the rod 30 to couple the seal outer member 50 with the rod 30, and thereby also couple the outer member 50 with the bearing outer ring 20. Also, the outer member base portion 52 is preferably disposed generally axially against a retainer ring 70, which functions to prevent axial displacement of the bearing outer ring 20 within the rod bore 31. However, the seal outer member 50 may alternatively be directly coupled with or attached to the bearing outer ring 20, such as by a friction fit in a bore (not indicated) of the outer ring 20 or by being disposed within an annular groove (none shown) formed in the ring 20.

Preferably, the majority of the base portion 52 (exclusive of the support member 60) and the lip portion 54 are preferably integrally connected and formed of a relatively flexible polymeric material, most preferably polyurethane. The support member 60 is preferably formed of a metallic material, e.g., aluminum or low carbon steel, or a rigid polymeric material and is encased within the remainder of the base portion 52. However, the seal outer member 50 may be formed of any appropriate material or combination of materials, may be formed without the support member 60 or/and may have any other appropriate shape or configuration.

Referring now to FIGS. 3-6, with the structure as described above, the seal lip portion 54 slidably displaces generally axially along the inner member engagement surface 42 when the bearing outer ring 20 displaces axially relative to the inner ring 14 during sideways "cocking" or axial displacement of the rod 30 relative to the shaft 18 between the two maximum positions $P_1$, $P_2$ as described above. With the preferred tapering engagement surface 42 described above, the lip portion 54 of the seal outer member 50 slidably displaces both axially and radially along the inner member engagement surface 42 when the bearing outer ring 20 displaces axially with respect to the bearing inner ring 14.

Figure 3:
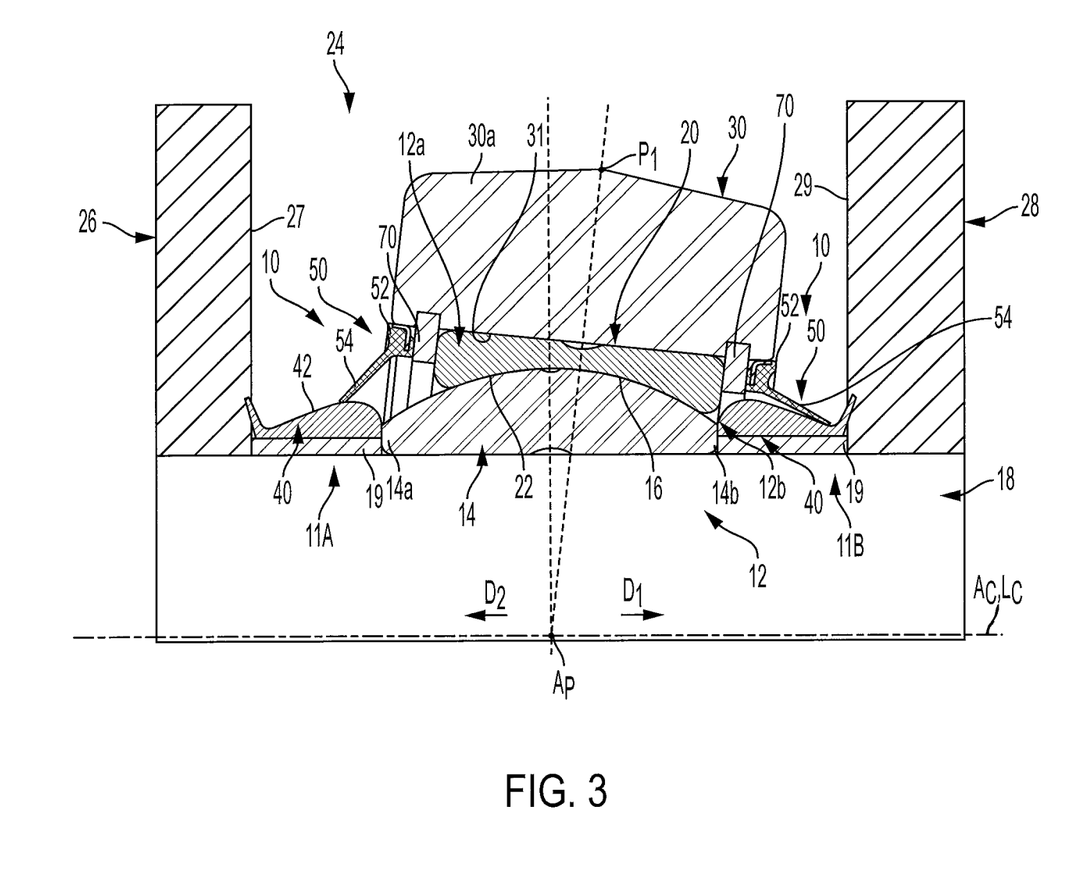
FIG. 3 is an axial cross-sectional view of an upper portion of the mechanical assembly, showing the bearing at a maximum angular position in a first direction along a central axis.
Figure 4:
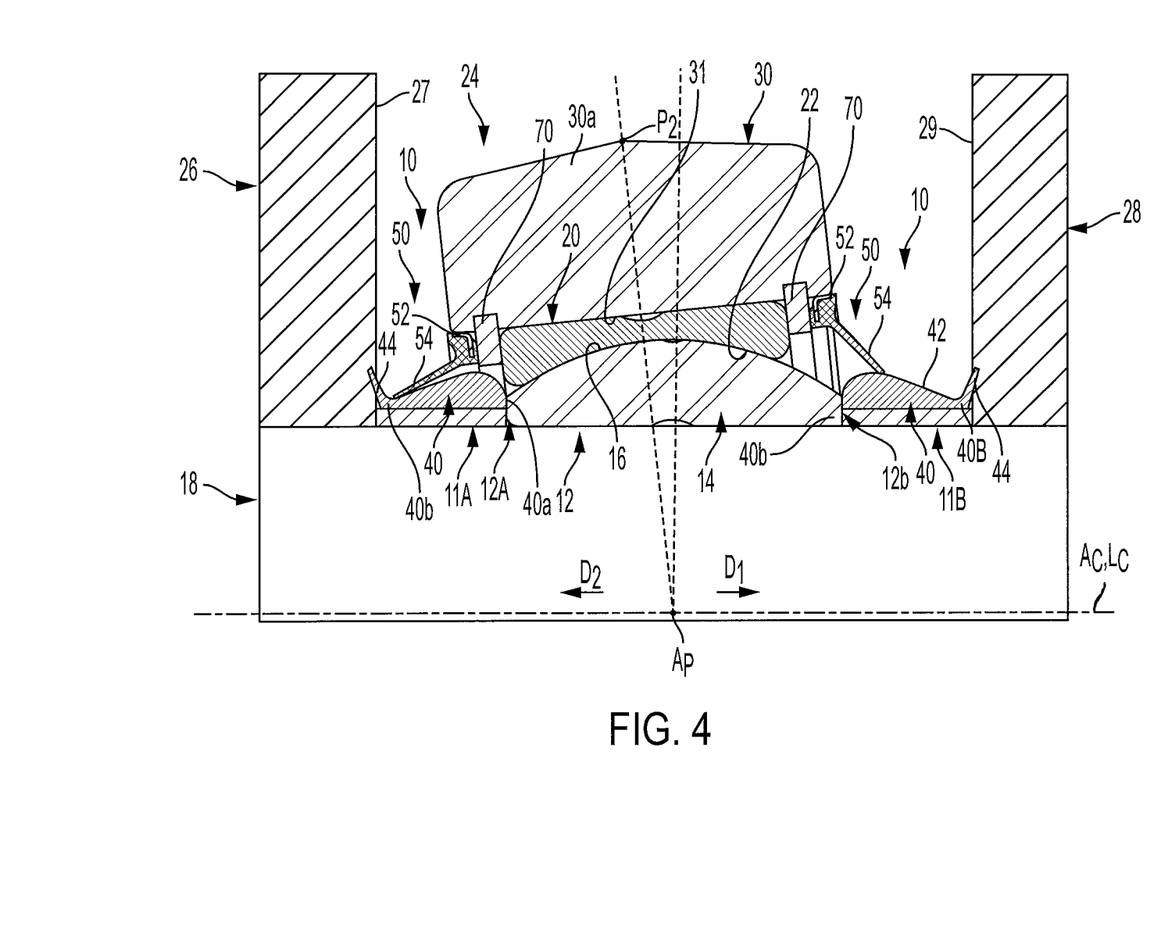
FIG. 4 is another axial cross-sectional view of the upper portion of the mechanical assembly, showing the bearing at a maximum angular position in a second direction along a central axis.
Figure 5:
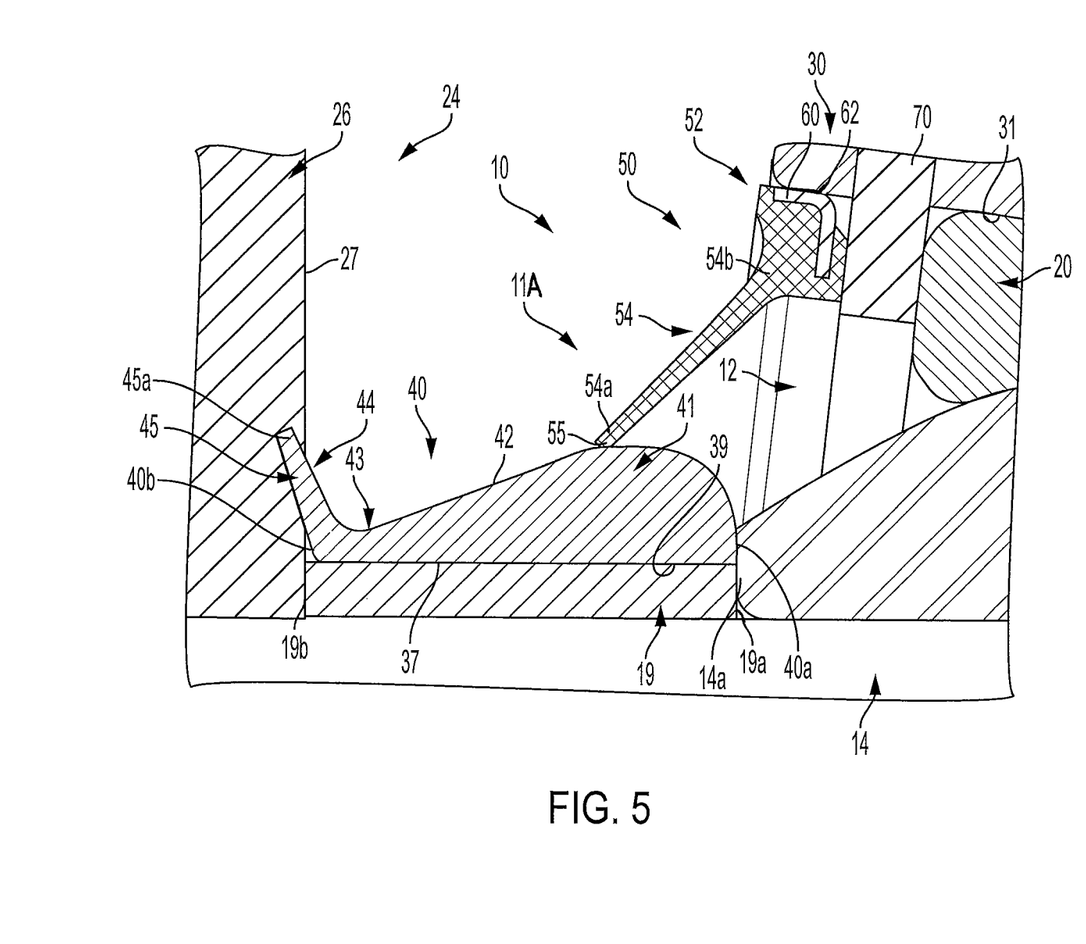
FIG. 5 is broken-away, enlarged view of a portion of FIG. 3, showing an outer member of a first seal assembly in a radially-outermost position.
Figure 6:
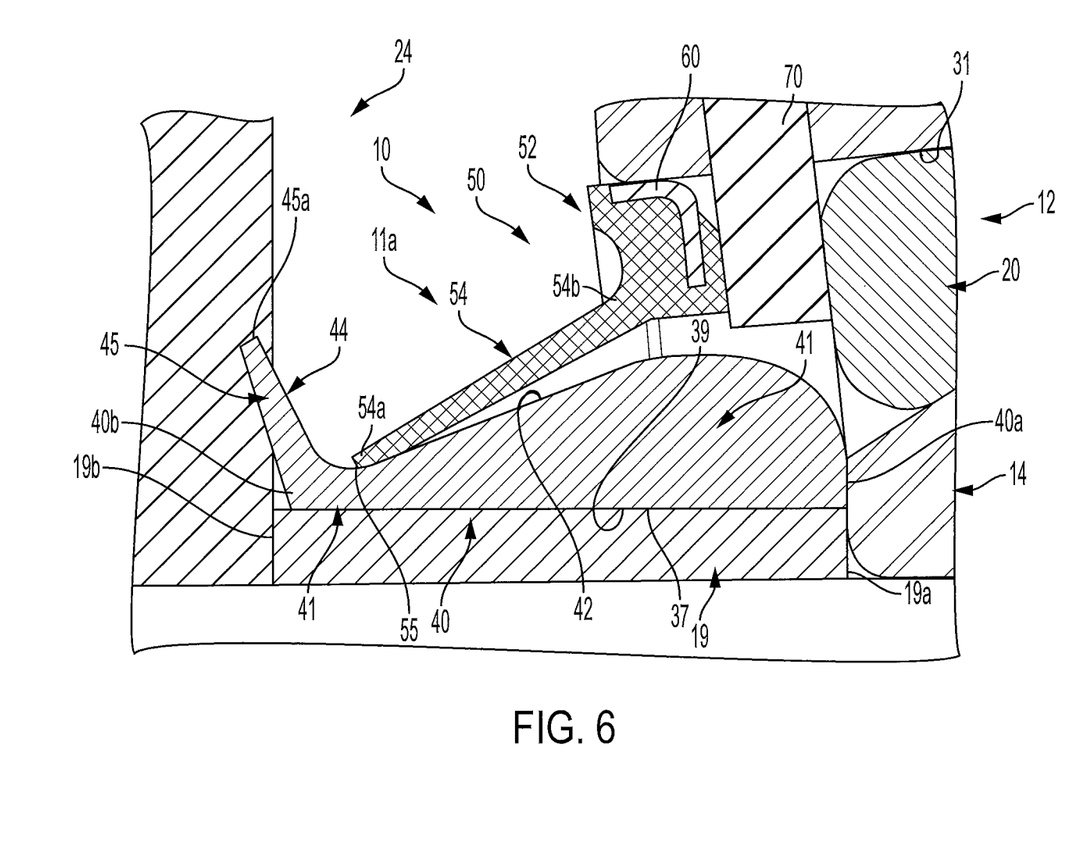
FIG. 6 is broken-away, enlarged view of a portion of FIG. 4, showing the outer member of the first seal assembly in a radially-innermost position.
Figure 7:
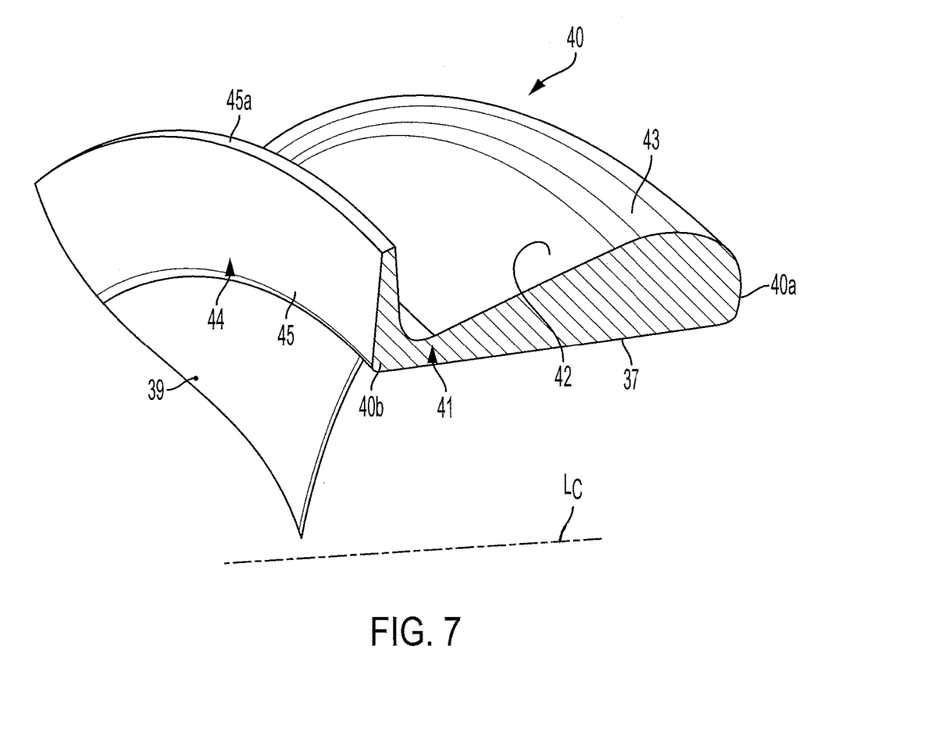
FIG. 7 is broken-away, perspective view of an inner member of the seal assembly, showing a first construction of the member.

That is, when the bearing outer ring 20 displaces in the first direction $D_1$ along the axis $A_C$, toward the first maximum position $P_1$, the lip portion 54 of the first seal 11A slides both radially outwardly and in the first axial direction $D_1$ along the engagement surface 42 of the first inner member 40, as shown in FIGS. 3 and 5. Generally simultaneously, the lip portion 54 of the second seal 11B slides both radially inwardly and in the first axial direction $D_1$ along the engagement surface 42 of the second inner member 40 to the position shown in FIG. 3. Conversely, when the bearing outer ring 20 displaces in a second direction $D_2$ along the axis $A_C$ toward the second maximum position $P_2$, the lip portion 54 of the first seal 11A slides radially inwardly and in the second axial direction $D_2$ along the first inner member engagement surface 42, while the lip portion 54 of the second seal 11B slides radially outwardly and in the second axial direction $D_2$ along the second inner member engagement surface 42. By having each outer member seal lip portion 54 slidably displacing along the tapered engagement surface 42 of each seal inner member 40, inversion of the lip portions 54 toward the bearing 12 is prevented.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal assembly for sealing a spherical plain bearing having an inner ring with a convex outer surface, the inner ring being mounted on a shaft with a central axis, and an outer ring disposed about the inner ring and having a concave inner surface slidably displaceable against the inner ring outer surface, the seal assembly comprising:

a generally annular seal inner member disposed about the shaft axially adjacent to the bearing inner ring and having opposing first and second axial ends and an outer engagement surface extending axially between the first and second ends; and a generally annular seal outer member having a base portion coupled with the bearing outer ring and a lip portion extending radially inwardly from the base portion and having an outer end sealingly engageable with the outer engagement surface of the seal inner member, the lip portion slidably displacing generally axially along the seal inner member engagement surface when the outer ring displaces relative to the inner ring.

2. The seal assembly as recited in claim 1 wherein the first axial end of the seal inner member is located adjacent to the bearing inner ring and the second axial end of the seal inner member includes a sealing portion configured to sealingly engage with a radial surface spaced axially from the bearing inner ring.

3. The seal assembly as recited in claim 2 wherein the sealing portion of the seal inner member is integrally formed with the seal inner member or provided by a separate seal ring coupled with the remainder of the seal inner member.

4. The seal assembly as recited in claim 2 wherein the seal inner member is formed of a polymeric material or a combination of at least one polymeric material and a metallic material.

5. The seal assembly as recited in claim 2 wherein the seal inner member has a radially-larger section located generally proximal to the seal inner member first axial end and a radially-smaller section located axially between the radially-larger section and the seal inner member second axial end, the seal inner member outer engagement surface tapering radially-inwardly along the axis from the radially-larger section to the radially-smaller section.

6. The seal assembly as recited in claim 5 wherein the lip portion of the seal outer member slidably displaces axially and radially along the engagement surface of the seal inner member when the bearing outer ring displaces with respect to the bearing inner ring.

7. The seal assembly as recited in claim 1 wherein the bearing outer ring is disposed within a rod having an inner circumferential surface and the seal outer member base portion includes a rigid support member having an outer circumferential surface frictionally engageable with an inner circumferential surface of the rod, a remainder of the base portion and the lip portion being integrally connected and formed of an elastomeric material.

8. The seal assembly as recited in claim 1 wherein:

the seal inner member is a first seal inner member located proximal to a first axial end of the bearing inner ring, the seal outer member is a first seal outer member coupled with a first axial end of the bearing outer ring; and the seal assembly further comprises:
a second annular seal inner member disposed on the shaft axially adjacent to a second axial end of the bearing inner ring, the second annular seal member having opposing first and second axial ends and an outer surface extending axially between the first and second ends; and
a second annular seal outer member having a base portion coupled with a second axial end of the bearing outer ring and a lip portion extending radially inwardly from the base portion and having an outer end sealingly engageable with the outer surface of the second seal inner member, the lip portion slidably displacing generally axially along the seal inner member outer surface when the outer ring displaces relative to the inner ring.

9. The seal assembly as recited in claim 8 wherein:
the second axial end of the first seal inner member is configured to sealingly engage with a first radial surface spaced in a first direction along the axis from the bearing inner ring; and
the second axial end of the second seal inner member is configured to sealingly engage with a second radial surface spaced in a second, opposing direction along the axis from the bearing inner ring.

10. A mechanical assembly comprising:
a shaft having a central axis;
a spherical plain bearing having an inner ring with a convex outer surface, the inner ring being mounted on the shaft, and an outer ring disposed about the inner ring and having a concave inner surface slidably displaceable against the inner ring outer surface;
a joint member coupled with the shaft so as to be spaced axially from the plain bearing and having a radial surface; and
a seal assembly including:
a generally annular seal inner member disposed about the shaft axially between the bearing inner ring and the joint member, the inner member having opposing first and second axial ends and an outer engagement surface extending axially between the first and second ends, the first axial end being located adjacent to the bearing inner ring and the second axial end including a sealing portion configured to sealingly engage with the joint member radial surface; and
a generally annular seal outer member having a base portion coupled with the bearing outer ring and a lip portion extending radially inwardly from the base portion and having an outer end sealingly engageable with the outer engagement surface of the seal inner member, the lip portion slidably displacing generally axially along the seal inner member engagement surface when the outer ring displaces relative to the inner ring.

11. The mechanical assembly as recited in claim 10 wherein the sealing portion of the seal inner member is integrally formed with the seal inner member or provided by a separate seal ring coupled with the seal inner member.

12. The mechanical assembly as recited in claim 10 wherein the seal inner member is formed of a polymeric material or a combination of at least one polymeric material and a metallic material.

13. The mechanical assembly as recited in claim 10 wherein the seal inner member has a radially-larger section located generally proximal to the seal inner member first axial end and a radially-smaller section located axially between the radially-larger section and the seal inner member second axial end, the seal inner member engagement surface tapering radially-inwardly along the axis from the radially-larger section to the radially-smaller section.

14. The mechanical assembly as recited in claim 13 wherein the lip portion of the seal outer member slidably displaces axially and radially along the engagement surface of the seal inner member when the bearing outer ring displaces with respect to the bearing inner ring.

15. The mechanical assembly as recited in claim 10 wherein the bearing outer ring is disposed within a rod having an inner circumferential surface and the seal outer member base portion includes a rigid support member having an outer circumferential surface frictionally engageable with an inner circumferential surface of the rod, a remainder of the base portion and the lip portion being integrally connected and formed of an elastomeric material.

16. The mechanical assembly as recited in claim 10 wherein:
the joint member is a first joint member;
the mechanical assembly further comprises a second joint member coupled with the shaft and spaced axially from the plain bearing such that the plain bearing is disposed between the first and second joint members, the second joint member having a radial surface;
the seal inner member is a first inner member located proximal to a first axial end of the bearing inner ring, the seal outer member is a first seal outer member coupled with a first axial end of the bearing outer ring; and
the mechanical assembly further comprises:
a second annular seal inner member disposed on the shaft axially adjacent to a second axial end of the bearing inner ring, the second annular seal inner member having opposing first and second axial ends and an outer surface extending axially between the first and second ends, the first axial end being located adjacent to the bearing inner ring and the second axial end including a sealing portion configured to sealingly engage with the second joint member radial surface; and
a second annular seal outer member having a base portion coupled with a second axial end of the bearing outer ring and a lip portion extending radially inwardly from the base portion and having an outer end sealingly engageable with the outer surface of the second seal inner member, the lip portion slidably displacing generally axially along the second seal inner member outer surface when the outer ring displaces relative to the inner ring.

* * * * *